Aug. 1, 1950
G. B. NODLE
2,517,337
AUTOMOBILE SUN VISOR ATTACHMENT
Filed Aug. 29, 1946
2 Sheets—Sheet 1
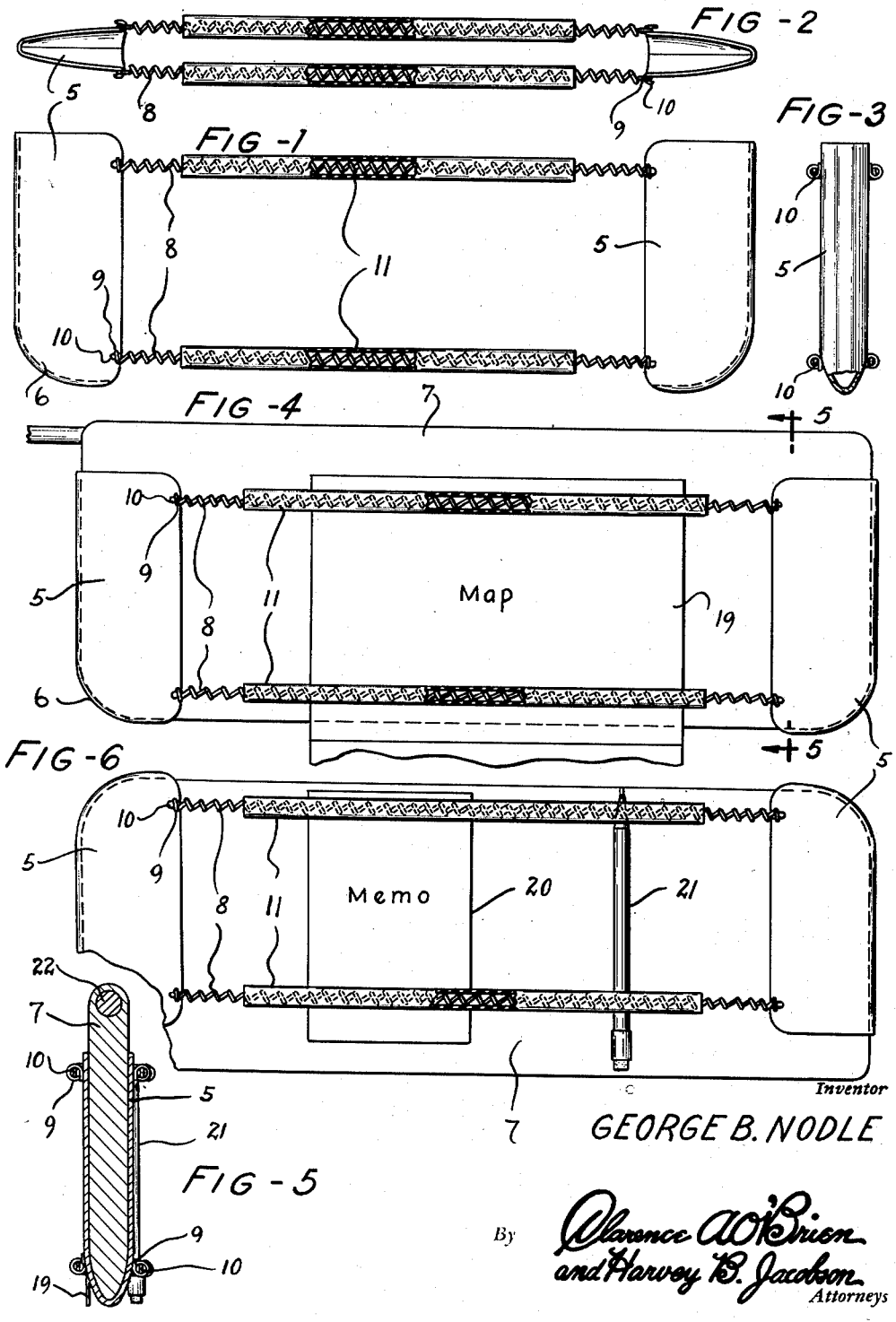

Aug. 1, 1950
G. B. NODLE
2,517,337
AUTOMOBILE SUN VISOR ATTACHMENT
Filed Aug. 29, 1946
2 Sheets—Sheet 2
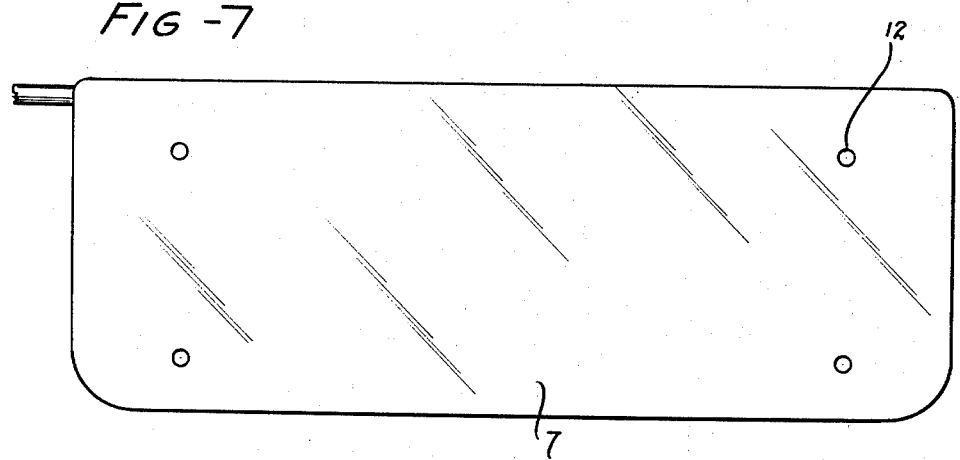
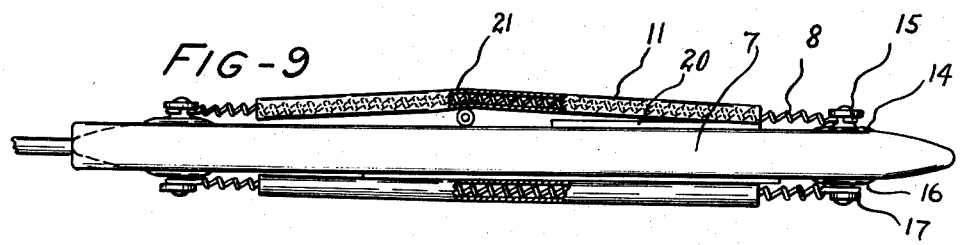
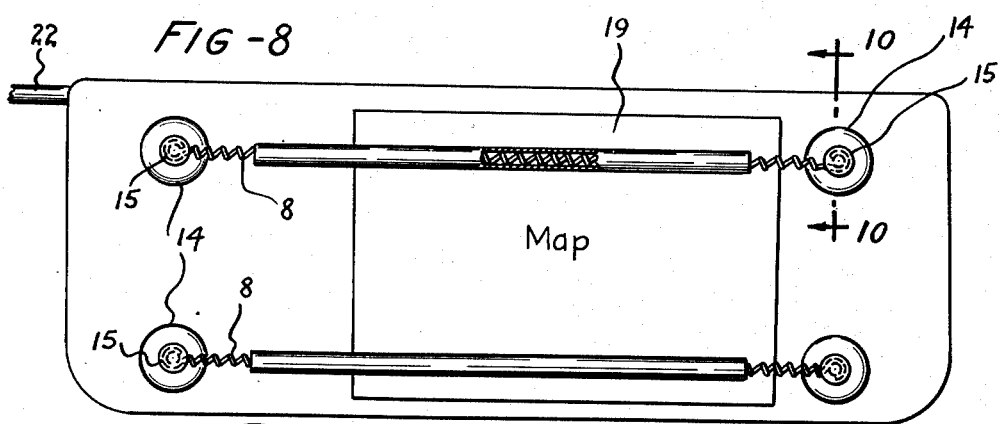
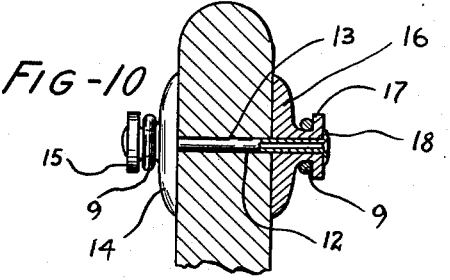
*Inventor*
GEORGE B. NODLE
By *Clarence A. O'Brien and Harvey B. Jacobson*
*Attorneys*

Patented Aug. 1, 1950

2,517,337

UNITED STATES PATENT OFFICE 2,517,337

AUTOMOBILE SUN VISOR ATTACHMENT

George B. Nodle, Santa Monica, Calif.

Application August 29, 1946, Serial No. 693,793

6 Claims. (Cl. 224—42.42)

1

The present invention relates to new and useful improvements in holders for road maps, memo pads, pencils and similar articles and the primary object of the invention is to provide an economical and simple device which may be attached to an ordinary vehicle sun visor for the purpose of holding the road maps or other articles in a convenient position thereon.

A further object of the invention is to provide a device of this character which is easily accessible to the driver so that maps may be conveniently inspected while held in place by the invention and without necessitating the removal of the hands of the driver from the steering wheel of the vehicle.

A still further object is to provide a device of this character which may be placed on vehicle sun visors of various sizes without necessitating any changes or alterations in the construction thereof.

Another object is to provide a device of this character of simple and practical construction, which is neat and attractive in appearance, relatively inexpensive to manufacture and otherwise well adapted for the purposes for which the same is intended.

Other objects and advantages reside in the details of construction and operation as more fully hereinafter described, and claimed, reference being had to the accompanying drawings forming part hereof, wherein like numerals refer to like parts throughout, and in which—

Figure 1 is a plan view of the device removed from a vehicle sun visor.

Figure 2 is a side elevational view thereof.

Figure 3 is an end elevational view.

Figure 4 is a front view of the device installed on a vehicle sun visor and showing a map placed thereon.

Figure 5 is a transverse sectional view on a line 5—5 of Figure 4.

Figure 6 is a rear view of the invention in use.

Figure 7 is a front view of a vehicle sun visor with drilled holes to provide a modified anchorage for the invention.

Figure 8 is a front view showing the modified form of the invention in place.

Figure 9 is a top plan view, and

Figure 10 is a fragmentary sectional view taken on a line 10—10 of Figure 8.

Referring now to the drawings in detail, and first with respect to the form of the invention illustrated in Figures 1 to 6 inclusive, the numeral 5 designates an envelope made of metal, plastic or other suitable material and curved at one end on a radius 6 so that it may fit over one end of a vehicle sun visor 7.

On each side of the sun visor are positioned a pair of coil springs or elastic bands 8 which are fastened at each of their ends 9 by a hook element 10 struck up from the material of the envelope 5 adjacent to the open edges thereof, the hook being bent outwardly away from the springs 8 so that the springs will be held in place under tension between a pair of the envelopes 5 when positioned on the opposite ends of a sun visor in the manner as shown in Figure 4 of the drawings.

Covering the coil springs 8 are rubber tubes 11 which will present a smooth surface against an object such as a road map 19 or the like.

In Figures 7 to 10 inclusive I have illustrated a modified form of the invention in which the vehicle sun visor 7 is drilled with holes 12 adjacent the corners thereof and in which are placed rivets 13 with a plate 14 and knob 15 integrally cast therewith, the plate 14 being positioned at one side of the sun visor and a second plate 16 formed with a knob 17 integrally cast therewith and placed at the other end of the rivets 13 and the outer end of the rivets protruding past the knob 17 is then upset or flattened as shown at 18. The knobs 15 and 17 afford a means of anchoring the eyes 9 of the coil springs 8 thereto.

In the operation of the device, by the use of the envelope 5 and hooks 10 or the knobs 15 and 17 as an anchor for the coil springs, the coil springs are held under tension against the surface of the sun visor and may be raised by hand and a map 19 placed under the coil springs at one side of the visor as shown in Figures 4 and 8. The sun visor can then be turned upwardly and a memo pad 20 and pencil 21 inserted between the coil springs at the opposite side of the visor.

The sun visor is supported in the usual manner on a rod 22 of conventional construction so that either side of the visor may be moved into position to bring the articles at either side thereof into the view of the driver.

In view of the foregoing description, taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully compre-

I claim:

1. An article holding attachment for vehicle sun visors and comprising a pair of envelopes engaging the ends of a sun visor, and a coil spring positioned in tension against one side of the visor and connected at its ends to and between the envelopes.

2. An article holding attachment for vehicle sun visors and comprising a pair of envelopes engaging the ends of a sun visor, hooks carried by the envelopes, and a coil spring positioned in tension against one side of the visor and connected at its ends to and between the hooks.

3. An article holding attachment for vehicle sun visors and comprising a pair of sheet metal envelopes engaging the ends of a sun visor, hooks struck from the envelopes, and a coil spring positioned in tension against one side of the visor and connected at its ends to and between the hooks.

4. An article-holding attachment for vehicle sun visors and comprising a pair of envelopes to engage the ends of a sun visor, and an elongated elastic element positioned in tension against one side of the visor and connected at its ends to and between the envelopes.

5. An article-holding attachment for vehicle sun visors and comprising a pair of envelopes to engage the ends of a sun visor, and a plurality of elongated elastic elements positioned in tension on opposite sides of the visor and connected at the ends of the elements to and between the envelopes.

6. An article holding attachment for vehicle sun visors and comprising a pair of sheet metal envelopes engaging the ends of a sun visor, hooks struck from the envelopes, and a coil spring positioned in tension against one side of the visor and connected at its ends to and between the hooks, said envelopes being each open at one side and at one end to receive the ends of the visor.

GEORGE B. NODLE.

REFERENCES CITED

The following references are of record in the file of this patent:

UNITED STATES PATENTS

| Number | Name | Date |
|---|---|---|
| 254,840 | Perry | Mar. 14, 1882 |
| 373,767 | Butler | Nov. 22, 1887 |
| 1,687,874 | McNally | Oct. 16, 1928 |
| 2,048,105 | Cobbs | July 21, 1936 |